Patented July 19, 1932

1,868,067

UNITED STATES PATENT OFFICE

AUGUSTE VICTOR KELLER, OF WELWYN GARDEN CITY, ENGLAND

MANUFACTURE OF CONDENSATION PRODUCTS

No Drawing. Application filed December 6, 1929, Serial No. 412,291, and in Great Britain November 13, 1929.

This invention relates to the manufacture of condensation products derived from the reaction of urea and an aldehyde.

When urea and formaldehyde or its solid polymers are condensed in solution without the aid of accelerating agents, the resulting product tends to become unstable and to precipitate any uncombined aldehyde. When, on the other hand, the condensation occurs in anhydrous or semi-anhydrous conditions, though it is distinctly advantageous in many respects so to promote the reaction in the partial or total absence of water, yet upon subsequent dilution, for example when endeavoring to obtain a solution which may be used as an impregnate, the product will be found not to possess absolute transparency.

I have now found that when the condensation reaction is carried out under substantially dry conditions, that is in the absence of free liquid as a solvent to promote the reaction, but in the presence of small amounts of acidic bodies and alkaline substances acting as catalysts, it is possible to produce clear, transparent, viscous condensation products from urea and solid polymers of formaldehyde, which remain stable and do not tend to solidify when kept over an indefinite period, nor to become turbid on standing or when further diluted.

According to this invention, the reacting substances and the alkaline catalyst are first mixed in a dry state, being preferably further mixed, moistened and heated by the introduction of saturated steam, and the acidic body being added last, in order to yield a product of the desired consistency and to aid in controlling the speed of the reaction and in rendering the initial condensation product stable. The acidic and alkaline bodies acting as catalysts form for example less than one per cent of the total reacting masses.

The process may be carried out as indicated in the accompanying examples.

*Example 1.*—160 lbs. of paraformaldehyde and 1½ ozs. of an alkaline salt, such as sodium hydroxide, or 3½ ozs. of sodium bicarbonate or 4½ ozs. of sodium carbonate, or the molecular equivalent of another basic salt, are intimately mixed in a dry state at a temperature of 60° C. in a jacketed and enclosed reaction vessel with 120 lbs. of urea. A preliminary reaction takes place with the production of mono-methylol urea or di-methylol urea or a mixture of the two, according to the exact temperature and pressure conditions existing in the vessel. To this dry mixing, saturated steam at between 70 to 80 lbs. pressure is added, the steam being arranged to enter the vessel in such a manner as to pass through and break up the contents. Next there is added a concentrated solution of 2½ lbs. of mono-sodium phosphate or its molecular equivalent in mono-potassium or mono-ammonium phosphate. The whole mixing is then allowed to react and maintained at a temperature of about 120° C. for 20 minutes, the mixture being agitated during the process by stirring blades and by the continued introduction of saturated steam.

*Example 2.*—160 lbs. of paraformaldehyde are intimately admixed, as in Example 1, with 120 lbs. of urea. Meanwhile, a concentrated solution of 2 lbs. of mono-sodium phosphate and 1 lb. of di-sodium phosphate is made, and 15 minutes after the urea and paraformaldehyde have been mixed in a dry state, this solution is added, the temperature being increased and saturated steam injected into the vessel.

The product obtained is produced in a fairly short space of time; it does not coagulate, it is clear, viscous, and transparent, and it remains stable under decreased temperature. The product may be solidified by evaporation, preferably in vacuo, and, if then ground into a fine powder, it may be formed into a transparent, insoluble, final reaction product by the application of pressure and/or heat. The reaction may be conducted under elevated or decreased pressure, and the water added when introducing the catalytic agents may be removed by evaporating in vacuo, if high concentration is desired, until the condensation product is sufficiently evaporated.

I have found that, by combining urea and paraformaldehyde in the manner herein described, the preliminary reaction between the two substances greatly reduces the time of the total condensation.

A further advantage of my process is that the introduction of saturated steam overcomes the mass attraction when dealing with large quantities, and causes a fine division or splitting up of the materials, thus enabling the reaction to proceed quickly and with the minimum of dilution.

The invention possesses a special advantage in large scale manufacture, inasmuch as the whole condensation process for a batch of 5 cwts. for example is completed within 40 minutes, eliminating the tedious long boiling under reflux as with urea formaldehyde products.

This invention is not restricted to the particular temperatures, pressures, conditions and quantities described in the examples given, and it is understood that variations in either direction may be made in one or more or any or all of these factors.

Salts, acids or bases other than those mentioned above may be used to accelerate, retard or otherwise catalytically influence the process of manufacture. By the expression "alkaline substance" or "alkaline catalyst", I mean any caustic alkali; by the expression "acidic body" or "acidic catalyst", I mean any acid-reacting salt, such as the acid phosphates mentioned, to the exclusion of sodium bicarbonate and like "acid salts" of strong bases and weak acids.

What I claim is:—

1. A process for the manufacture of urea-aldehyde condensation products in stable form, consisting in preparing a dry mixture of a solid polymer of formaldehyde and urea with a very small percentage of an alkaline substance, injecting steam into the mixture, adding a small percentage of an acid phosphate, and maintaining the heat while stirring the mixture.

2. A process for the manufacture of urea-aldehyde condensation products in stable form, consisting in combining urea in a dry state with a solid polymer of formaldehyde in presence of an alkaline catalyst to produce a methylol urea, injecting steam into the mixture, adding a small percentage of an acid phosphate, and maintaining the heat while stirring the mixture.

3. A process for the manufacture of urea-aldehyde condensation products in stable form, consisting in preparing a dry mixture of urea and a solid polymer of formaldehyde in presence of an alkaline catalyst, injecting steam into the mixture, adding a small percentage of an acidic catalyst, and maintaining the heat while agitating the mixture for some minutes.

4. A process for manufacturing urea-aldehyde condensation products, consisting in combining urea in a dry state with paraformaldehyde in presence of a very small percentage of a caustic alkali, injecting steam with agitation of the mixture, adding a small percentage of an acid phosphate, maintaining the heat while stirring the mixture, and solidifying the product by evaporation.

5. A process for manufacturing urea-aldehyde condensation products, consisting in combining urea in a dry state with paraformaldehyde in presence of a very small percentage of a caustic alkali, injecting steam with agitation of the mixture, adding a small percentage of an acid phosphate, maintaining the heat while stirring the mixture, solidifying the product by evaporation, grinding the solidified product, and converting it into the final reaction product by application of heat.

6. A process for manufacturing urea-aldehyde condensation products, consisting in combining urea and paraformaldehyde by a preliminary reaction in the dry state in presence of an alkaline catalyst, injecting steam, adding a small percentage of an acid-reacting salt, and effecting the final condensation under heat.

In testimony whereof, I have affixed my signature.

AUGUSTE VICTOR KELLER.